US012146625B2

(12) United States Patent
Procter et al.

(10) Patent No.: US 12,146,625 B2
(45) Date of Patent: Nov. 19, 2024

(54) SECTOR LIGHT AND LENS

(71) Applicant: SEALITE PTY LTD, Somerville (AU)

(72) Inventors: Jeffrey Kenneth Procter, Mount Eliza (AU); Wane Russel Spoor, Somerville (AU)

(73) Assignee: SEALITE PTY LTD, Somerville (AU)

( * ) Notice: Subject to any disclaimer, the term of this patent is extended or adjusted under 35 U.S.C. 154(b) by 0 days.

(21) Appl. No.: 18/187,576

(22) Filed: Mar. 21, 2023

(65) Prior Publication Data

US 2023/0220965 A1 Jul. 13, 2023

Related U.S. Application Data

(63) Continuation of application No. 17/433,509, filed as application No. PCT/AU2020/050197 on Mar. 3, 2020, now Pat. No. 11,608,951.

(30) Foreign Application Priority Data

Mar. 4, 2019 (AU) ................................ 2019900693

(51) Int. Cl.
*F21S 10/02* (2006.01)
*B63B 45/04* (2006.01)
(Continued)

(52) U.S. Cl.
CPC .............. *F21S 10/02* (2013.01); *B63B 45/04* (2013.01); *F21S 2/005* (2013.01); *F21V 5/007* (2013.01);
(Continued)

(58) Field of Classification Search
CPC .......... F21S 10/02; B63B 45/02; B63B 45/04; F21W 2111/04; F21W 2111/043;
(Continued)

(56) References Cited

U.S. PATENT DOCUMENTS 3,609,023 A 9/1971 Turboult et al.
6,667,582 B1 12/2003 Procter
(Continued)

FOREIGN PATENT DOCUMENTS

CN 206222084 U 6/2017
EP 3072819 A1 9/2016
(Continued)

OTHER PUBLICATIONS

International Preliminary Report on Patentability for PCT/AU2020/050197, dated Aug. 25, 2021.
(Continued)

*Primary Examiner* — Tracie Y Green
*Assistant Examiner* — Michael Chiang
(74) *Attorney, Agent, or Firm* — Husch Blackwell LLP

(57) ABSTRACT

The present invention discloses a sector light, said sector light having at least one tier including a light source assembly comprising opaque dividing elements, two or more light sources, and two or more optical lenses; wherein the light source assembly is divided into circumferential sections, each circumferential section being separated by the opaque dividing elements, and each circumferential section containing a light source and an optical lens arranged such that the optical lens collects and outwardly projects the light emitted by the light source.

18 Claims, 2 Drawing Sheets

(51) Int. Cl.

| | |
|---|---|
| ***F21S 2/00*** | (2016.01) |
| ***F21V 5/00*** | (2018.01) |
| ***F21V 5/04*** | (2006.01) |
| ***F21V 15/01*** | (2006.01) |
| ***F21V 31/00*** | (2006.01) |
| *F21W 111/04* | (2006.01) |
| *F21Y 113/10* | (2016.01) |
| *F21Y 113/17* | (2016.01) |
| *F21Y 115/10* | (2016.01) |

(52) U.S. Cl.

CPC .............. *F21V 5/046* (2013.01); *F21V 5/048* (2013.01); *F21V 15/01* (2013.01); *F21V 31/005* (2013.01); *B63B 2201/08* (2013.01); *F21W 2111/04* (2013.01); *F21Y 2113/10* (2016.08); *F21Y 2113/17* (2016.08); *F21Y 2115/10* (2016.08)

(58) Field of Classification Search

CPC . F21W 2111/047; F21V 7/0083; F21V 5/007; F21Y 2103/33

See application file for complete search history.

(56) References Cited

U.S. PATENT DOCUMENTS

| | | | | |
|---|---|---|---|---|
| 10,151,444 | B1 | 12/2018 | Tsai et al. | |
| 2003/0031030 | A1 | 2/2003 | Simms | |
| 2004/0095777 | A1 | 5/2004 | Trenchard et al. | |
| 2006/0250269 | A1 | 11/2006 | Wang et al. | |
| 2007/0236931 | A1 | 10/2007 | Chien | |
| 2008/0025020 | A1 | 1/2008 | Kolb | |
| 2008/0247161 | A1 | 10/2008 | Hulsey et al. | |
| 2008/0247184 | A1 | 10/2008 | Matsumoto et al. | |
| 2010/0091507 | A1 | 4/2010 | Li et al. | |
| 2013/0088152 | A1 * | 4/2013 | Hagen | F21V 23/005 315/130 |
| 2013/0294069 | A1 | 11/2013 | Udris et al. | |
| 2014/0191885 | A1 | 7/2014 | Dauphin et al. | |
| 2014/0313729 | A1 | 10/2014 | Uhler et al. | |
| 2014/0321107 | A1 * | 10/2014 | Namors | F21V 21/06 362/184 |
| 2014/0362571 | A1 | 12/2014 | Leeuwangh | |
| 2015/0192265 | A1 * | 7/2015 | Yu | G02B 6/0031 362/511 |
| 2016/0280396 | A1 * | 9/2016 | Schoen | B64D 47/06 |
| 2017/0096095 | A1 | 4/2017 | Uhrenholt | |
| 2018/0038581 | A1 | 2/2018 | Nolan et al. | |
| 2018/0073692 | A1 | 3/2018 | Jurik et al. | |
| 2021/0116098 | A1 | 4/2021 | Deng et al. | |
| 2021/0285620 | A1 | 9/2021 | Bu et al. | |

FOREIGN PATENT DOCUMENTS

| | | | | |
|---|---|---|---|---|
| FR | 2 866 693 | A1 | 8/2005 | |
| JP | 2009076250 | A | 4/2009 | |
| WO | WO-2011029127 | A1 * | 3/2011 | B63B 45/02 |

OTHER PUBLICATIONS

Extended European Search Report issued for European Patent Application No. 20766831.0 dated Sep. 12, 2023, 8 pages.

* cited by examiner

SECTOR LIGHT AND LENS

CROSS-REFERENCE TO RELATED APPLICATION

This application claims the benefit of U.S. patent application Ser. No. 17/433,509, filed Aug. 24, 2001, which is a national stage filing of and claims the benefit of PCT/AU2020/050197, filed Mar. 3, 2020, which claims priority to Australian patent application No. AU 2019900693, filed on Mar. 4, 2019, the contents of which are incorporated by reference herein in their entirety.

FIELD OF THE INVENTION

The present invention relates to a sector light that may be used as a visual aid to navigation, particularly by marine vessels and aircraft. It also relates to a light source assembly for use in a sector light and to methods of using the sector light and light source assembly.

BACKGROUND

Sector lights are used to assist navigation, in particular marine navigation by providing guidance for safely steering vessels on course, for example towards a port or other area of interest.

Sector lights are so-called because they emit light into one or more defined 'sectors' of a surrounding geographical region. By sighting emitted light, or emitted light of a particular nature, a user is informed as to the sector in which they are operating. Sectors are usually defined to be 'safe' and 'unsafe' based on the surrounding geographical characteristics. By continually sighting the light associated with a safe sector, a user may be guided on a safe course. By sighting the light associated with an unsafe sector, or no light, a user may be informed of danger and that an alteration of course is necessary. For example, in the case of maritime regions, a safe sector is that in which a vessel can travel while avoiding obstacles such as rocky outcrops and shallow waters etc., while an unsafe sector is that in which such an obstacle lies.

Commonly, sector lights emit light into more than one sector, for example into both safe and unsafe sectors. To differentiate the light between the different sectors, different colors are used. Typically, sector lights include a white light to indicate the safe sector, and a red and/or green light to indicate an unsafe sector on the port and starboard sides, respectively (or vice versa, depending on country).

It is desirable for the light source(s) to be both energy efficient and visible over long distances, and LEDs have now mostly replaced incandescent light bulbs as they consume less power, have a longer effective life and create less light scatter. It is also desirable for the emitted light to have a sharp cut-off at its edges to minimize the area of uncertainty and clearly define the sector boundary, especially when sectors are adjacent each other, so that there is no or minimal overlap of light in the adjacent sectors, e.g. so that light of only one color can be sighted at a time.

Many LED sector lights are omnidirectional, and an optical lens or reflector is used to deflect the light in all 360 degrees of the plane of desired direction, usually the horizontal plane. Sectors are then created using wrap-around opaque sector plates with an opening for light only in the direction of the sector. Alternatively, or in addition, Total Internal Reflection (TIR) lenses may be used to collimate the light in the desired direction.

However, it is necessary to construct these LED sector lights into tiers, each tier containing a different light source for each sector. Sector lights remain accordingly bulky and heavy. Omnidirectional sector lights also waste light and reduce range when only a fraction of the 360 degrees in which the light irradiates is open to the sector. There are also problems remaining with light scatter, which wastes light, and it can be difficult to achieve a suitable light cut-off with an area of uncertainty of less than a few degrees, even with TIR lenses.

There exists a need to overcome, or at least alleviate, one or more of the difficulties or deficiencies associated with the prior art.

SUMMARY

In a first aspect, the present invention provides a sector light, said sector light having at least one tier which includes:

- a light source assembly comprising:
  - opaque dividing elements,
  - two or more light sources, and
  - two or more optical lenses;
- wherein the light source assembly is divided into circumferential sections, each circumferential section being separated by the opaque dividing elements, and each circumferential section containing a light source and an optical lens arranged such that the optical lens collects and outwardly projects the light emitted by the light source into a sector, whereby the projected light when viewed from a position indicates whether that position is in a safe or an unsafe sector.

Each light source may independently include an LED or an incandescent globe. Ideally, each light source will provide sufficient intensity to achieve a usable range depending on the application at hand. In most cases, a range of at least 1, 2, 3, 4, 5, 6, 7 or 8, or even up to 12, nautical miles is desirable, preferably of at least 8 nautical miles. In a preferred embodiment, each light source is an LED, more preferably a high intensity LED, say with a power rating of at least 1 watt. Each light source may also independently emit a light of selected configuration, preferably a selected light color. In preferred embodiments, at least one white light source and one or both of a red and a green light source will be included in the sector light. Also in preferred embodiments, the tier including a light source assembly comprising two or more light sources will include both a red and a green light source in that tier.

The sector light may include more than one tier, at least one tier which includes a light source assembly comprising two or more light sources, and any additional tiers containing at least one light source. In this embodiment, multiple tiers with the same number and configuration of light sources and optical lens may be used to increase light intensity and extend the projection range of the light, or an additional tier may contain light source(s) which emits a differently configure light, e.g. light of a different color. Preferably, each tier is individually enclosed by opaque elements except where apertures are intended to permit light projection. Having tiers separated by opaque elements helps to reduce light interference between the tiers.

In a preferred embodiment, the sector light includes a plurality of tiers, more preferably two tiers. In a preferred embodiment, the light emitted by a plurality of light sources, more preferably two, is projected from a single tier of the sector light. In a preferred embodiment, these light sources emit light of different configurations, preferably different colors. In a particularly preferred embodiment, the sector light includes two tiers, one tier comprising a light source assembly comprising at least two circumferential sections, each containing a light source and optical lens while the other tier includes a light source assembly comprising at least only one section and only one light source and optical lens. Preferably, each of these light sources emit lights of different configurations e.g. colors. For example, it is particularly preferred that the tier with one light source is a white light source, for projecting into a safe sector, while the tier with at least two light sources includes a red and a green light source, for projecting into unsafe sectors. Thereby, the projected light when viewed from a position indicates whether that position is in a safe or an unsafe sector, and when an unsafe sector, also in which direction the safe sector lies.

The sector light may also include a casing. The casing encompasses the light source assembly and is comprised of opaque elements except where apertures are intended to permit light projection. The casing may define the tiers. The light source assembly may be mounted within the casing in a substantially central manner. The casing may be sealed, for example to the weather, and may include transparent portions to permit light projection. The transparent portions may be included as part of a wrap-around cover in the form of blinker and may be sealed with the casing by way of, for example, rubber seals.

The sector light may also include electronic componentry for example to control the sector light which may include for example a circuit board, processor or similar, and communication modules for remote connections, for example Wi-Fi, Bluetooth, satellite or similar, connectivity. Various functions of the sector light may be controlled, including each light source independently, for example on and off, alter intensity, and set numerous configurations e.g. flashing or blinking patterns, amongst other functions. Sensors may also be included for collecting and optionally transmitting data, for example as to ambient light intensity, weather patterns etc. Suitably, the electronic componentry will be housed in a protrusion to better send and receive communications. In a preferred embodiment, the electronic componentry is housed in a top-mounted centrally-disposed dome.

By an "optical lens" is meant a lens having one or more focal planes that has the ability to capture light and project it substantially in a desired direction. In a preferred embodiment, the optical lens is substantially convex and comprises front and rear optical faces with the focal planes there between, the rear face being a first point of collection of light emitted by the light source, and the front face being that from which light is projected. Also in the preferred embodiment, the optical lens comprises sides and ends with non-reflective properties (e.g., matt finish). The non-reflective sides and ends may assist to define the boundaries of light projection by reducing light scatter, and are preferably light impermeable. The sides and ends may also take a form which facilitates fitment in the light source assembly and/or installation in the sector light, e.g., including protrusions or indentations. The angle in which the optical lens has the ability to project light in the horizontal or vertical planes is not particularly limited, but is preferably between approximately 30 and 60 degrees in the horizontal and with a narrow angle of divergence in the vertical, of approximately 0.5 to 5 degrees. The angle of curvature of the optical lens in both planes is preferred accordingly. Preferably, the optical lens has the ability to project light in 45 degree sectors in the horizontal plane and substantially linearly in the vertical plane, with an angle of divergence of about, or less than, 3 degrees in the vertical plane. The optical lens thus gives rise to an advantage of the present invention, as it is capable of collecting and projecting light from a light source with a comparatively sharp cut-off with a narrow area of uncertainty, usually of about 0.5 degrees or less, thereby allowing light, especially light of two or more configurations e.g. colors, to be independently projected into two or more sectors from a single tier of the sector light. The sector light may thus be characterized by comparatively less bulk and weight.

In preferred embodiments, the optical lens is positioned in the light source assembly between, and in abutment with, two opaque dividing elements, preferably in abutment with an end face of each opaque dividing element, at a distance in front of, and centrally-disposed to, the light source.

The light source assembly comprising two or more light sources and two or more optical lenses in different circumferential sections of the light source assembly may comprise 2, 3, 4, 5, 6, 7 or 8 or more light sources and optical lenses in different circumferential sections of the light source assembly. Each circumferential section may also independently include two or more light sources, preferably arranged in close configuration such that the individual light projections appear as one. Preferably the light source assembly is divided into at least the same number of circumferential sections as there are optical lenses, each circumferential section being separated by opaque dividing elements and containing one light source. The circumferential sections may be arranged side by side or opposite each other, or any arrangement there between. In a preferred embodiment, the light source assembly is composed of a central hub from which opaque dividing elements radially protrude. The configuration of the central hub is not necessarily limited to circular form, though preferable. Matching the preferred features of the optical lens, preferably the opaque dividing elements of the central hub protrude at an angle of 45 degrees relative to each other (based on the centerlines), to a length sufficient for the optical lens to fit there between or abut the end faces thereof. Similarly, as in preferred embodiment each optical lens has the ability to project light in 45 degree sectors in the horizontal plane, preferably the light source assembly comprises 8 circumferential sections so that, when 8 light sources and 8 optical lenses are included, light may be projected into all 360 degrees in the horizontal plane. For example, in applications where light of one configuration, say a single color, is required to be outwardly projected into sectors with an area wider than 45 degrees (or the angle of the projection of light by the optical lens, whatever it may be) then two or more light source may be included in sections of the light source assembly side-by side. If the sector area is not evenly divisible by 45, then the wrap-around cover, or blinker, may assist to cut off light at the desired angle. Of course, the number of light sources and optical lenses included may be dictated by the particular application at hand. In one tier of the sector light, this will be at least two of each, preferably of a different color. If additional tiers are included in the sector light, this may be as few as one of each. The feature(s) of the opaque dividing elements in providing multiple circumferential sections of the light source assembly also gives rise to an advantage of the present invention, in reducing light scatter and assisting the optical lenses to project light into two or more sectors from a single tier of the sector light, for example light of two or more colors.

The sector light of the present invention finds particular application for use in marine navigation, but may also have other applications, e.g. air navigation. In the case of the former, the sector light may be mounted on land to guide a vessel into port, or on a vessel to guide other vessels thereto, say supply vessels. When mounted on land, the arrangement of the circumferential sections of the light source assembly and/or the circumferential sections of the light source assembly containing light sources and optical lenses, will generally be dictated by the characteristics of the surrounding geographical region, for example the lie of the land, location of obstacles and channels etc. For example, the sections of the light source may be arranged such that a white light is projected into a safe sector, say containing a channel, optionally together with a red and/or green light projected into an unsafe sector, say shallow water on either side of the channel.

Accordingly, in a second aspect, the present invention provides a method for assisting navigation of vessels, preferably marine vessels, said method including providing a sector light according to the present invention, and locating the sector light in a position where light emitted therefrom may be viewed by said vessels.

The sector light in its preferred embodiments may be as hereinbefore described. In a preferred embodiment, the sector light includes a plurality of tiers, more preferably two tiers. In a preferred embodiment, the light emitted by a plurality of light sources is projected from a single tier of the sector light. In a preferred embodiment, these light sources may emit light of configurations, preferably different colors. In a particularly preferred embodiment the sector light includes two tiers, one tier comprising a light source assembly comprising at least two circumferential sections each containing a light source and optical lens, while the other tier includes a light source assembly comprising at least only one section and only one light source and optical lens. Preferably, each of these light sources project lights of different configurations e.g. colors. For example, it is particularly preferred that the tier with one light source is a white light source, for projecting into a safe sector, while the tier with at least two light sources includes a red and a green light source, for projecting into unsafe sectors. Thereby, the projected light when viewed from a position indicates whether that position is in a safe or an unsafe sector, and when an unsafe sector, also in which direction the safe sector lies.

The sector light may be located in any suitable position such that light emitted therefrom may be viewed by vessels. For marine navigation, the sector light may be located on land, in the water or on a vessel. When located on land or in the water, the sector light may be mounted on a suitable structure. Preferably the sector light is located such that the sections of the light source assembly and/or the sections of the light source assembly containing light sources and optical lenses, are arranged so that a white light is projected into a safe sector, optionally together with a red and/or green light projected into an unsafe sector. Preferably, lights of two different colors are projected from a single tier of the sector light.

The light source assembly is preferably a central component of the sector light. The assembly itself and/or other component of the sector light, say the casing, may be responsible for securely positioning the light source assembly and optical lens therein, while the light source assembly may itself be responsible for sectioning of the light sources with opaque dividing elements and vis the lens projecting the light from the sector light. In a preferred embodiment, the light source assembly is composed of a central hub from which opaque dividing elements radially protrude. The configuration of the central hub is not necessarily limited to circular form, though preferable. Matching the preferred features of the optical lens, preferably the opaque dividing elements of the central hub protrude at an angle of 45 degrees relative to each other (based on the centerlines), to a length sufficient for the optical lens to fit there between or abut the end faces thereof.

Accordingly, in a third aspect, the present invention provides a light source assembly comprising:

- opaque dividing elements,
- two or more light sources, and
- two or more optical lenses;
- wherein the light source assembly is divided into circumferential sections, each circumferential section being separated by the opaque dividing elements, and each circumferential section containing a light source and an optical lens and arranged such that the optical lens collects and outwardly projects the light emitted by the light source.

The light source assembly, light sources and optical lenses may be as hereinbefore described, including in their preferred embodiments.

The sector light and light source assembly of the present invention thus offer economic benefits and enhance the portability of such devices by use of a compact design, specifically by disclosing an arrangement whereby two or more light sources, especially of two or more colors, may be projected from a single tier of the sector light.

In this specification, the term 'comprises' and its variants are not intended to exclude the presence of other integers, components or steps.

In this specification, reference to any prior art in the specification is not and should not be taken as an acknowledgement or any form of suggestion that this prior art forms part of the common general knowledge in Australia or any other jurisdiction or that this prior art could reasonably expected to be combined by a person skilled in the art.

The present invention will now be more fully described with reference to the accompanying Examples and drawings. It should be understood, however, that the description following is illustrative only and should not be taken in any way as a restriction on the generality of the invention described above.

Moreover, a sector light having at least one tier is disclosed. The sector light has a light source assembly. The assembly includes at least one opaque dividing element, at least two light sources, and at least two optical lenses, wherein the light source assembly is divided into at least two circumferential sections, each of the at least two circumferential sections is separated by the at least one opaque dividing element and wherein each of the at least two circumferential sections contains a light source and an optical lens arranged such that the optical lens collects and outwardly projects light emitted by at least one of the two light sources into a sector, whereby a projected light when viewed from a position indicates whether the position is in a safe sector.

Additionally, a light source assembly is disclosed. The light source assembly includes at least two light sources and at least two optical lenses, wherein the at least two optical lenses are substantially convex with sides and ends having non-reflective properties. The light source assembly is divided into at least two circumferential sections, each of the at least two circumferential sections being enclosed by at least one opaque dividing element and where each of the least two circumferential sections contain a light source and an optical lens and arranged such that the optical lens collects and outwardly projects light emitted by the light source.

DETAILED DESCRIPTION OF THE EMBODIMENTS

Figure 1:
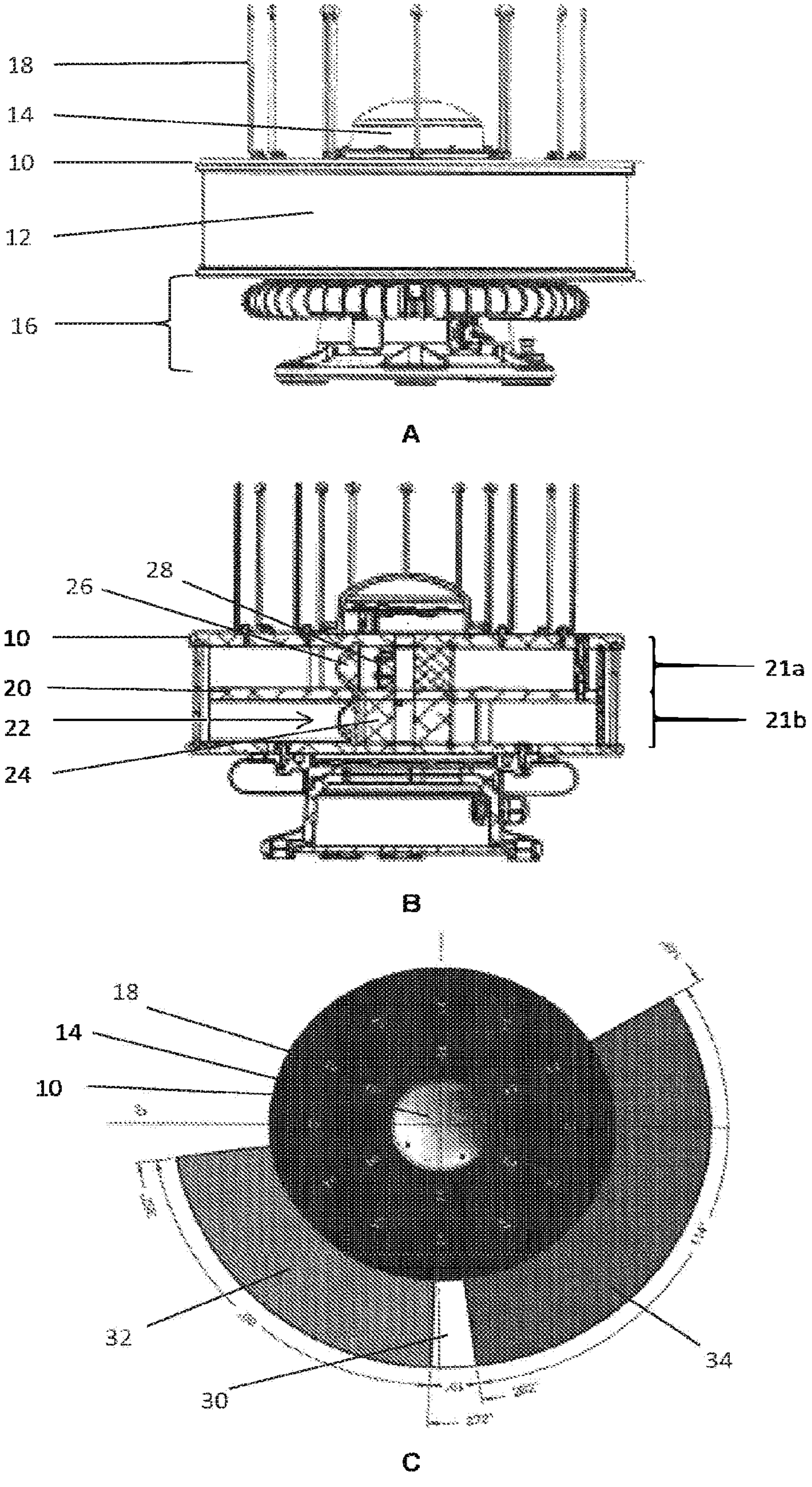
FIG. 1 shows one embodiment of a sector light according to the present invention: A) front view; B) front cross-section; C) top view

FIG. 1 illustrates in one embodiment a sector light of the present invention. With reference to FIG. 1A, the sector light includes a cylindrical casing 10 including a wrap-around cover in the form of a blinker 12. The blinker includes transparent portions (not shown) through which light may be projected into sectors, but is otherwise generally opaque. The sector light also includes a top-mounted centrally-disposed dome 14 to house electronic componentry. A mounting platform 16 is included for mounting the sector light to a suitable structure, and also a number of upstanding pins 18 to prevent birds from perching and fouling the sector light.

With reference to cross-sectional FIG. 1B, two tiers of the sector light are shown within the casing 10 separated by an opaque casing wall 20 which is generally horizontal in use. Within each tier 21 is a light source assembly 22 including opaque dividing elements 24. Abutting the end faces of opaque dividing elements are optical lenses 26. The light source assembly in the top tier 21*a* is shown the light source, in this embodiment the light source 28 is an LED.

In this embodiment the light source assembly in the top tier includes a white light source for projecting into a safe sector, while the light source assembly in the bottom tier includes, in side-by-side sections, both a red and a green light source for projecting into unsafe sectors. This is better depicted in FIG. 10 which is a view towards the top of the sector light. The cylindrical casing 10, dome 14 and pins 18 are indicated for perspective. The white light 30 is indicated projecting from the top tier of the sector light into a safe sector. On either side a red 32 and green 34 light is indicated projecting from the bottom tier of the sector light into unsafe sectors. This is an arrangement that would be suitable, for example to guide a marine vessel through a narrow channel, though it is not limiting. The light source assembly and/or lights within the light source assembly may be arranged to project light in any of the 360 degrees of the horizontal plane.

Figure 2:
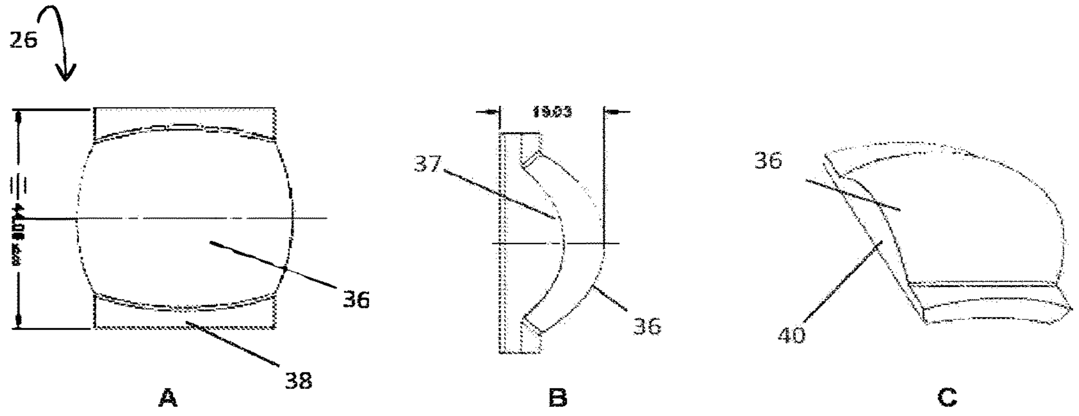
FIG. 2 shows one embodiment of the sector light optical lens: A) front view; B) top view cross-section; C) isometric view.

FIGS. 2A to 2C show various views of one embodiment of the sector light optical lens 26. The front view as shown in FIG. 2A reveals the front optical face 36. It is flanked by non-reflective (e.g. matt finish) ends 38 which engage with opaque casing walls (e.g. 20) when installed in the light source assembly in the sector light. FIG. 2B illustrates a top view cross-section of the optical lens with front 36 and rear 37 optical faces, which highlights its convex shape and 45 degree curvature. A non-reflective (e.g. matt finish) side 40 is indicated in FIG. 2C, which abuts with opaque dividing elements when installed in the light source assembly.

Figure 3:
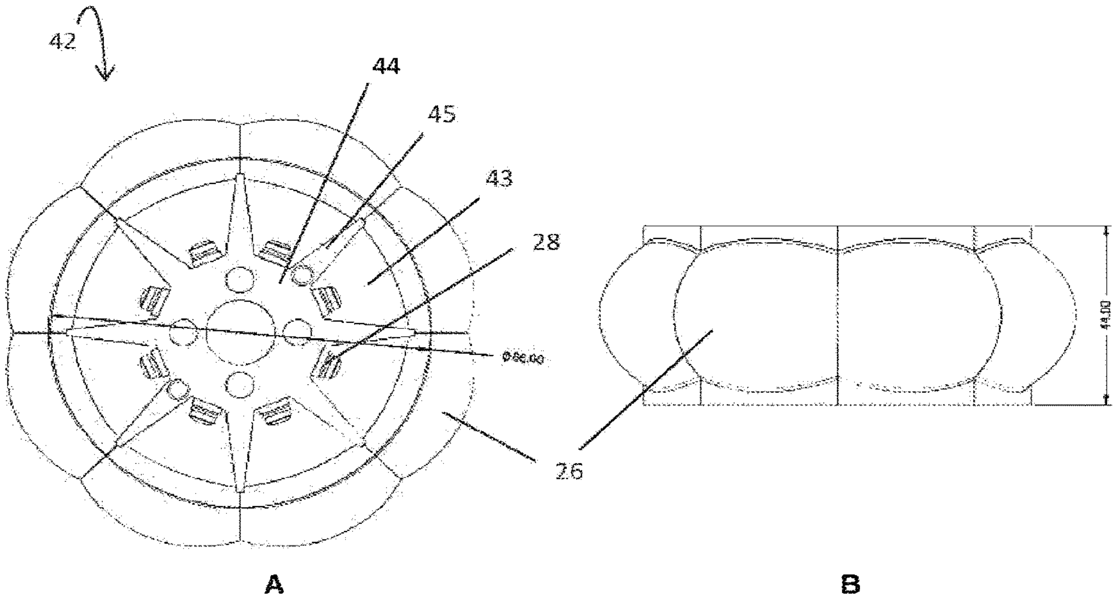
FIG. 3 shows one embodiment of a light source assembly for insertion into the cavity of one tier of the sector light: A) top view; B) front view.

FIG. 3 in top view 3A and front view 3B illustrates one embodiment of the light source assembly 42 housed within each tier of the sector light. The light source assembly includes an opaque central hub 44 from which 8 opaque dividing elements 45 radially protrude at 45 degrees to each other (based on the centerlines) separating the assembly into 8 circumferential sections 43. The 8 LED light sources 28 are included, one in each circumferential section 43. The LED light sources 28 are attached to the central hub and arranged centrally between opaque dividing elements 45 from where they protrude from the central hub. Accordingly, 8 optical lenses 26 are included abutting the end faces of the opaque dividing elements 45 and each other, at a distance in front of, and centrally-disposed to, the light source 28, arranged to define the periphery of the light source assembly 42.

This arrangement is not intended to be limiting. The 45 degree angle of protrusion of the opaque dividing elements 45 simply matches the 45 degree curvature of the optical lens illustrated in FIG. 2. In alternative embodiments, two or more opaque dividing elements may protrude in any direction with any angles. Nor are all 8 light sources and optical lenses required in all embodiments. In at least one tier of the sector light, preferably the light source assembly includes two light sources each with an optical lens. In other tiers, the light source assembly may include a single light source with an optical lens and where only two opaque dividing elements radially protrude from the central hub.

What is claimed is:

1. A sector light having at least one tier, the sector light further including:

a sealed casing having at least one transparent portion, and a light source assembly positioned radially inwards from the sealed casing, the light source assembly provided in a form of:

an opaque central hub, at least one opaque dividing element radially protruding from the opaque central hub, at least two light sources, and at least two optical lenses, wherein the light source assembly is divided into at least two circumferential sections, each of the at least two circumferential sections being separated by the at least one opaque dividing element and each of the at least two circumferential sections containing one of the at least two light sources and one of the at least two optical lenses arranged such that the one of the at least two optical lenses collect and outwardly project light emitted by the at least one of the two light sources into a sector.

2. The sector light according to claim 1 further comprising at least one opaque casing wall oriented in a horizontal direction to separate the at least one tier into a first tier and a second tier.

3. The sector light according to claim 2, wherein each of the at least two optical lenses is substantially convex and includes an angle of curvature between 30 degrees and 60 degrees, each of the at least two optical lenses further comprising:

a front optical face and a rear optical face with a focal plane therebetween, the rear optical face being a first point of collection of light emitted by the at least two light sources, and the front optical face being that from which light is projected, and at least one side and at least one end, the at least one side and the at least one end each having non-reflective properties, wherein the at least one end engages with the at least one opaque casing wall.

4. The sector light according to claim 3, wherein the at least one side and the at least one end are each light impermeable to define boundaries of light projection by reducing light scatter.

5. The sector light according to claim 1, wherein at least three opaque dividing elements are present to form the at least two circumferential sections arranged side by side.

6. The sector light according to claim 1, wherein each optical lens projects light in at least one vertical plane with an angle of divergence of 0.5 degrees to 5 degrees.

7. The sector light according to claim 1, wherein each of the at least two light sources is an LED.

8. The sector light according to claim 1, wherein in use the at least two light sources each independently project a different color of light from the sector light.

9. The sector light according to claim 1 further comprising a signal housing element for facilitating remote connections.

10. The sector light according to claim 1, wherein the at least two light sources may project light outwardly through the at least one transparent portion.

11. A light source assembly comprising:

at least two light sources;

at least two substantially convex optical lenses each with a side and an end having non-reflective properties; and at least one opaque casing wall designed to engage with the end from each of the at least two substantially convex optical lenses, wherein the light source assembly is divided into at least two circumferential sections, each of the at least two circumferential sections having at least one opaque dividing element, wherein each of the at least two circumferential sections contains one of the at least two light sources and one of the at least two substantially convex optical lenses lens arranged such that one of the at least two substantially convex optical lenses collects and outwardly projects light emitted by one of the at least two light sources.

12. The light source assembly according to claim 11 further comprising an opaque central hub, wherein a first dividing element from the at least one opaque dividing element protrudes from the central hub at an angle of about 45 degrees relative to a second dividing element from the at least one opaque dividing element, and wherein the first dividing element has a length extending between the central hub and one of the at least two substantially convex optical lenses.

13. The light source assembly according claim 12, wherein each of the at least two substantially convex optical lenses has an angle of curvature between 30 degrees and 60 degrees and include a front optical face and a rear optical face with a focal plane therebetween, wherein the rear optical face is a first point of collection for light emitted by the at least two light sources and the front optical face is that from which light is projected.

14. The light source assembly according to claim 11, wherein each optical lens projects light in a vertical plane with an angle of divergence of 0.5 degrees to 5 degrees.

15. The light source assembly according to claim 11, wherein at least one of the at least two light sources is an LED, wherein at least one of the at least two light sources protrudes from the central hub, and further wherein at least one of the at least two light sources is arranged centrally within one of the at least two circumferential sections.

16. The light source assembly according to claim 11, wherein in use each of the at least two light sources independently projects a different color of light from the light source assembly.

17. The light source assembly according to claim 11, wherein the light source assembly is enclosed in an opaque casing including a wrap-around cover having transparent portions through which the at least two light sources may project outwardly, wherein the opaque casing is sealed to protect an interior cavity from exposure to external elements.

18. The sector light according to claim 11, wherein the non-reflective properties are provided at least in part by a matt finish.

* * * * *